US012793224B2

(12) United States Patent
Cheng et al.

(10) Patent No.: US 12,793,224 B2

(45) Date of Patent: Nov. 10, 2026

(54) NEURAL NETWORK-BASED HEART RATE DETERMINATIONS

(71) Applicants: Hewlett-Packard Development Company, L.P., Spring, TX (US); Purdue Research Foundation, West Lafayette, IN (US)

(72) Inventors: Yang Cheng, West Lafayette, IN (US); Qian Lin, Palo Alto, CA (US); Jan Allebach, West Lafayette, IN (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 303 days.

(21) Appl. No.: 18/250,526

(22) PCT Filed: Oct. 29, 2020

(86) PCT No.: PCT/US2020/058029

§ 371 (c)(1),
(2) Date: Apr. 25, 2023

(87) PCT Pub. No.: WO2022/093243

PCT Pub. Date: May 5, 2022

(65) Prior Publication Data

US 2024/0005505 A1 Jan. 4, 2024

(51) Int. Cl.
*G06T 7/00* (2017.01)

(52) U.S. Cl.
CPC .. *G06T 7/0016* (2013.01); *G06T 2207/10024* (2013.01); *G06T 2207/20084* (2013.01);
(Continued)

(58) Field of Classification Search
CPC .... G06F 2218/08; G06N 3/0464; G06N 3/08; G06T 2207/20084; G06T 2207/30076;
(Continued)

(56) References Cited

U.S. PATENT DOCUMENTS

| | | | | |
|---|---|---|---|---|
| 5,957,860 A * | 9/1999 | Rodiera Olive | A61B 5/1106 600/554 |
| 9,852,507 B2 | 12/2017 | Gunther et al. | |

(Continued)

FOREIGN PATENT DOCUMENTS

| | | | |
|---|---|---|---|
| BR | 102017015265 A2 * | 1/2019 | A61B 5/0013 |
| CN | 106725410 A | 5/2017 | |
| WO | WO-2017051415 A1 * | 3/2017 | A61B 5/0077 |

OTHER PUBLICATIONS

Benedetto et al (Year: 2019).*

(Continued)

*Primary Examiner* — Vu Le

(74) *Attorney, Agent, or Firm* — Quarles & Brady LLP

(57) ABSTRACT

In some examples, an electronic device comprises an interface to receive a video of a human face, a memory storing executable code, and a processor coupled to the interface and to the memory. As a result of executing the executable code, the processor is to receive the video from the interface, use a facial detection technique to produce a sequence of images of the human face based on the video, use a neural network to predict a photoplethysmographic (PPG) signal based on the sequence of images, convert the PPG signal to a frequency domain signal, and determine a heart rate by performing a frequency analysis on the frequency domain signal.

20 Claims, 4 Drawing Sheets

(52) U.S. Cl.
CPC ............... *G06T 2207/30076* (2013.01); *G06T 2207/30201* (2013.01)

(58) Field of Classification Search
CPC .......... G06T 2207/30201; G06V 10/82; G06V 40/161
See application file for complete search history.

(56) References Cited

U.S. PATENT DOCUMENTS

| | | | | |
|---|---|---|---|---|
| 10,750,959 | B2 | 8/2020 | Gupta et al. | |
| 10,755,125 | B2 | 8/2020 | Gupta et al. | |
| 2009/0043180 | A1* | 2/2009 | Tschautscher | A61B 5/6838 600/323 |
| 2013/0088600 | A1* | 4/2013 | Wu | H04N 19/463 348/149 |
| 2013/0253334 | A1* | 9/2013 | Al-Ali | A61B 5/0261 600/300 |
| 2014/0303454 | A1* | 10/2014 | Clifton | A61B 5/0022 600/479 |
| 2016/0089086 | A1* | 3/2016 | Lin | A61B 5/02416 600/479 |
| 2017/0071516 | A1* | 3/2017 | Bhagat | A61B 5/0261 |
| 2018/0314879 | A1* | 11/2018 | Khwaja | A61B 5/02416 |
| 2019/0125270 | A1* | 5/2019 | Deriso | A61B 5/0205 |
| 2019/0239761 | A1* | 8/2019 | Tao | G06T 5/40 |
| 2019/0350471 | A1* | 11/2019 | Marks | A61B 5/0006 |
| 2020/0105400 | A1* | 4/2020 | Alvelda, VII | G06V 10/26 |
| 2020/0214614 | A1* | 7/2020 | Rundo | A61B 5/7267 |
| 2020/0221956 | A1* | 7/2020 | Tzvieli | G01J 5/0025 |
| 2020/0367773 | A1* | 11/2020 | Wang | A61B 5/02405 |
| 2021/0106241 | A1* | 4/2021 | Kerman | A61B 5/7278 |
| 2021/0386306 | A1* | 12/2021 | Oh | A61B 5/6898 |
| 2023/0284981 | A1* | 9/2023 | Jones | A61B 5/0077 |

OTHER PUBLICATIONS

Botina-Monsalve et al (Year: 2020).*
Gudi et al (Year: 2019).*
Chen et al (Year: 2018).*
De Haan et al (Year: 2013).*
Blackford et al (Year: 2015).*
Sani et al., Determination of Heart Rate from Photoplethysmogram using Fast Fourier Transform, 2015.*
Ayesha et al., Heart Rate Monitoring Using PPG With Smartphone Camera, 2021.*
Kumar et al., DistancePPG: Robust non-contact vital signs monitoring using a camera, 2015.*
Ruoast et al., Remote heart rate measurement using low-cost RGB face video: a technical literature review, 2018.*
Real-Time Webcam Heart-Rate and Variability Estimation with Clean Ground Truth for Evaluation (Year: 2020).*
Chen, W., et al.,"DeepPhys: Video-Based Physiological Measurement Using Convolutional Attention Networks", Oct. 9, 2018, pp. 356-373.
Fernandes, S.L., et al., "A novel nonintrusive decision support approach for heart rate measurement", Science Direct, Jul. 3, 2017, p. 12.
Hassan, M. A. et al., "Video-Based Heartbeat Rate Measuring Method Using Ballistocardiography", IEEE, 2017, p. 14.

* cited by examiner

NEURAL NETWORK-BASED HEART RATE DETERMINATIONS

BACKGROUND

The human heart rate is frequently measured in a variety of contexts to obtain information regarding cardiovascular and overall health. For example, doctors often measure heart rate in clinics and hospitals, and individuals often measure their heart rates at home.

BRIEF DESCRIPTION OF THE DRAWINGS

Various examples are described below referring to the following figures.

DETAILED DESCRIPTION

A variety of techniques and devices can be used to measure heart rate, including manual palpation, infrared heart rate monitors that attach to fingers or other parts of the body, etc. These approaches for measuring heart rate have multiple disadvantages. For example, because the subject is present in person for her heart rate to be measured, she is at risk for the transmission of pathogens via heart rate monitoring devices or via the air, and she spends time and money traveling to and from the clinic at which her heart rate is to be measured. Some technologies use cameras to measure heart rate from a remote location, but these technologies are unable to accurately measure heart rate in challenging conditions, such as when the subject is moving her head or is in a poorly-lit area.

This disclosure describes various examples of a technique for using a camera to remotely measure heart rate in a variety of conditions, including the challenging conditions described above. In examples, the technique includes obtaining a video clip of a subject's face, such as through a recorded video or a live-stream video. The technique also includes detecting the subject's face in the video (e.g., using a convolutional neural network) to produce a sequence of images of the subject's face. The technique includes converting the color space of the images in the sequence of images from red-green-blue (RGB) to L*a*b*, which mitigates the loss of accuracy caused by head movements. The technique includes providing the resulting sequence of images as inputs to a trained deep neural network, and the deep neural network predicts a photoplethysmographic (PPG) signal based on the sequence of images. The technique also includes applying a Fourier transform to the PPG signal to convert the PPG signal to the frequency domain. The frequency domain signal is analyzed to identify the heart rate of the subject.

Figure 1:
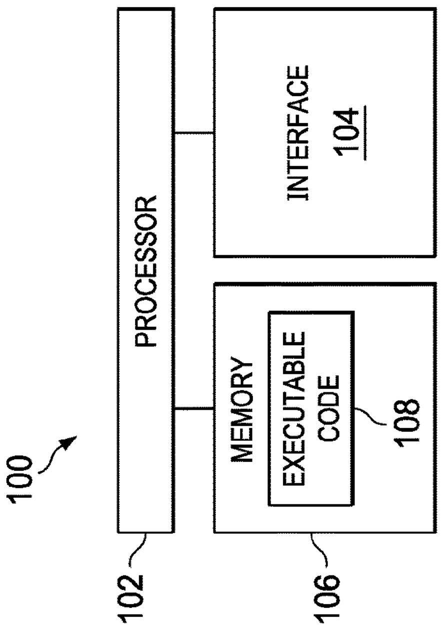
FIG. 1 is a schematic block diagram of an electronic device to perform neural network-based heart rate determinations, in accordance with various examples.

FIG. 1 is a schematic block diagram of an electronic device to perform neural network-based heart rate determinations, in accordance with various examples. In particular, FIG. 1 shows an electronic device 100, such as a personal computer, a workstation, a server, a smartphone, etc. In examples, the electronic device 100 includes a processor 102, an interface 104 coupled to the processor 102, and a memory 106 coupled to the processor 102. The memory 106 includes executable code 108. In some examples, a microcontroller or other suitable type of controller may be substituted for the processor 102 and/or the memory 106. The processor 102 accesses the executable code 108 in the memory 106 and executes the executable code 108. Upon execution, the executable code 108 causes the processor 102 to perform some or all of the actions attributed herein to the processor 102 and/or to the electronic device 100. In examples, the executable code 108 includes instructions to implement some or all of the techniques described herein, such as the methods and neural networks described below with reference to FIGS. 2-7. In addition, the scope of this disclosure is not limited to electronic devices in which processors execute executable code to perform the techniques described herein. Rather, other types of electronic devices, such as field programmable gate arrays and application-specific integrated circuits, also may be used.

The interface 104 may be any suitable type of interface. In some examples, the interface 104 is a network interface through which the electronic device 100 is able to access a network, such as the Internet, a local area network, a wide local area network, a virtual private network, etc. In some examples, the interface 104 is a peripheral interface, meaning that through the interface 104, the electronic device 100 is able to access a peripheral device, such as a camera (e.g., a webcam), a removable or non-removable storage device (e.g., a memory stick, a compact disc, a portable hard drive), etc. In some examples, the electronic device 100 includes multiple interfaces 104, with each interface 104 to facilitate access to a different peripheral device or network.

Figure 2:
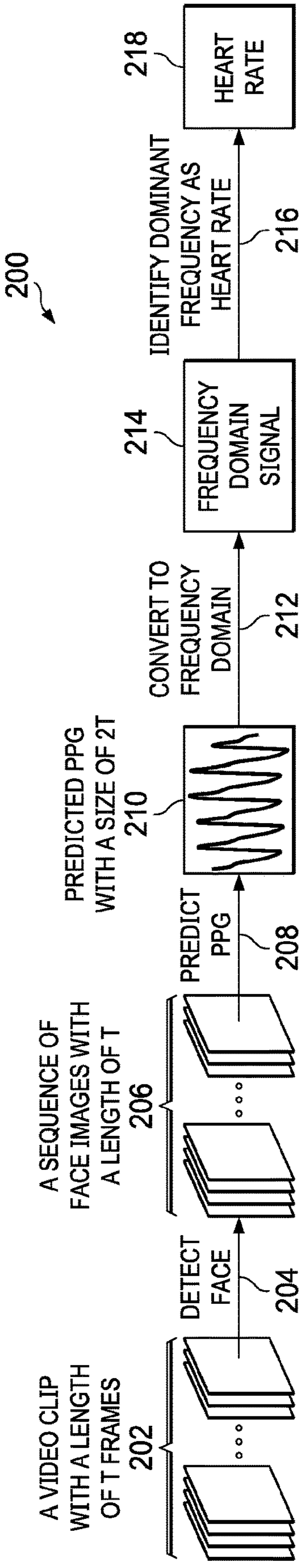
FIG. 2 is a schematic diagram of a process flow for performing neural network-based heart rate determinations, in accordance with various examples.
Figure 3:
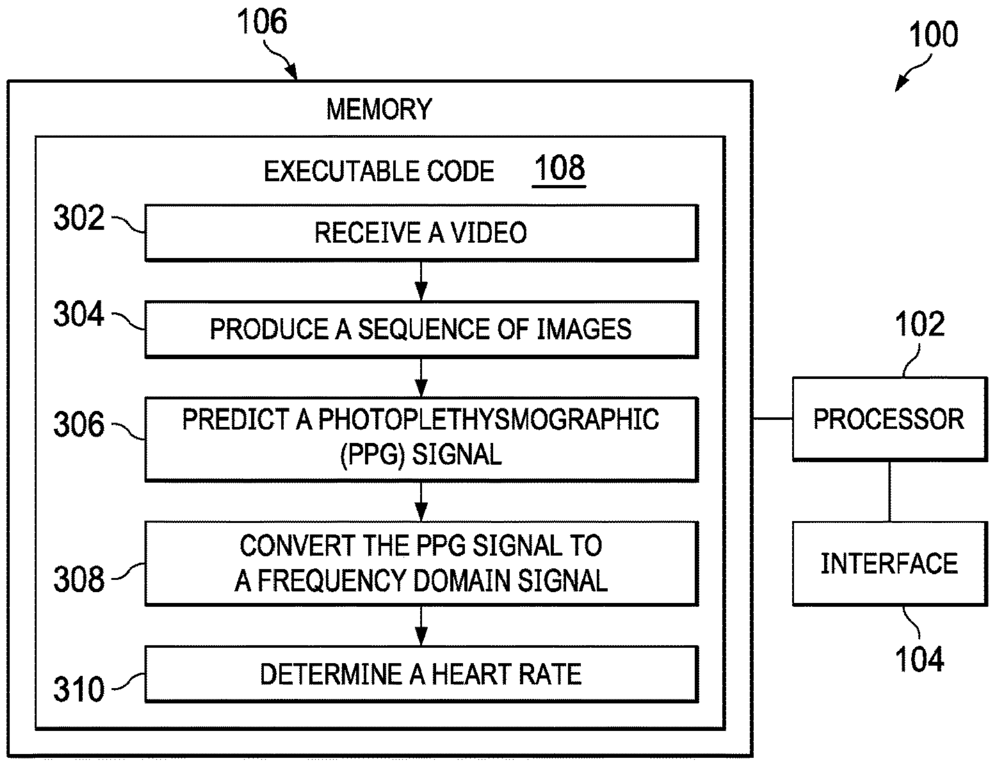
FIGS. 3 and 4 are schematic block diagrams of electronic devices to perform neural network-based heart rate determinations, in accordance with various examples.

FIG. 2 is a schematic block diagram of a process flow 200 for performing neural network-based heart rate determinations, in accordance with various examples. The processor 102 (FIG. 1) may implement the process flow 200 upon execution of the executable code 108. FIG. 3 is a schematic block diagram of an example of the electronic device 100 to perform neural network-based heart rate determinations. Accordingly, the process flow 200 and the electronic device 100 are now described in parallel.

The electronic device 100 of FIG. 3 includes the processor 102, the interface 104 coupled to the processor 102, and the memory 106 coupled to the processor 102. The memory 106 includes the executable code 108. The executable code 108 begins with receiving a video from an interface (302), such as the interface 104. Process flow 200 depicts a video (also known as a video clip) 202, which includes a number of frames T. Each frame may include a human face. Each frame may also include other features, such as a background in which the human face is located (e.g., office furniture, trees and shrubs in a park, etc.). The frames may be sequential so that, when viewed in order, they form the video 202. In the video 202, the human face may be moving to the left, right, up, down, backward, forward, etc. In the video 202, the human face may be stationary in space but the muscles of the face may be moving, for example, in the act of speech, smiling, squinting, etc.

In examples, the video 202 has a frame rate of at least 10 frames per second (FPS). A frame rate of 10 FPS may be used in such examples because the range of heart rates that can be accurately detected depends on the frame rate, e.g., half of the 10 FPS is 5 Hertz (Hz), which corresponds to a maximum detectable heart rate of 300 beats per minute. The frame rate may be adjusted as desired to obtain a target heart rate range. In some examples, however, a higher frame rate enables the use of fewer than all frames in the video during the facial recognition process. For example, a frame rate of 30 FPS enables the selection of fewer than every frame during the facial recognition process. For instance, a frame rate of 30 FPS may enable the selection of every fourth frame for the facial recognition process. The remainder of this description assumes a frame rate of 30 FPS, although, as explained, the frame rate may vary.

In examples, the video 202 is recorded with the human face positioned at least 20 inches from the camera with which the video 202 is recorded. In examples, the video 202 is at least 10 seconds in length, assuming a total of 320 images collected and a frame rate of 30 FPS (e.g., 320 divided by 30 is approximately 10 seconds). An increase in the number of images collected increases heart rate frequency resolution, but collecting more images also increases the length of the video, which represents an inconvenience to the subject. Thus, an application-specific decision may be made (e.g., by a programmer or a subject) to balance the heart rate frequency resolution with the time a subject spends recording the video. The programmer or subject may decide to spend less time recording the video with a resulting coarser heart rate frequency resolution, or s/he may decide to spend more time recording the video with a resulting finer heart rate frequency resolution. In addition to a frame rate of 30 FPS, the remainder of this description assumes 320 images collected and a video duration of 10 seconds. In examples, the video 202 is pre-recorded and is accessible to the processor 102 via a peripheral interface 104, such as from a storage device or a network. In examples, the video 202 is a live stream that is accessible to the processor 102 via a camera interface 104, such as from a webcam coupled to the electronic device 100. In examples, the video 202 is a live stream that is accessible to the processor 102 via a network interface 104, such as from the Internet.

The executable code 108 includes using a facial detection technique to produce a sequence of images of the human face based on the video (304). The process flow 200 depicts the use of a facial detection technique at 204. In examples, facial detection is performed using a neural network. In examples, facial detection is performed using a convolutional neural network (CNN). In examples, facial detection is performed using a multi-task cascaded convolutional neural network (MTCNN). In examples, the neural network used for facial detection includes pre-trained weights. For instance, the neural network may have been trained on a data set(s) appropriate for facial detection that may produce appropriate weights in the neural network to achieve accurate facial detection.

A bounding box may be applied to the frames of the video 202 to facilitate facial detection. However, the use of a bounding box may result in undesirable jitter of the bounding box. In addition, the neural network-based facial detection technique may be computationally intensive. To reduce bounding box jitter and to simultaneously reduce computational load, the processor 102 may use the neural network (e.g., the MTCNN) to detect the human face of the video 202 in fewer than every frame. For example, the processor 102 may detect the human face of the video 202 in every $n^{th}$ frame of the video 202, where n is two, three, four, five, six, or another suitable positive integer. In examples, the integer n is determined based on the frame rate of the video 202. For instance, assuming the frame rate of the video 202 is 30 FPS, the human face is unlikely to move significantly over the course of 4 frames (e.g., approximately 0.13 seconds), and thus it may be appropriate for the processor 102 to perform facial detection on every $4^{th}$ frame of the video 202 rather than on every frame of the video 202. The result of performing 304 of executable code 108 and 204 of process flow 200 is the sequence of images 206 of the human face.

The executable code 108 includes using a neural network to predict a photoplethysmographic (PPG) signal based on the sequence of images 206 (306). Numeral 208 represents this prediction in FIG. 2. In some examples, the processor 102 converts a color space of the sequence of images 206 from red-green-blue (RGB) to L*a*b. Conversion of the color space to L*a*b is beneficial because head movement affects image intensity and not image chromaticity, and thus by considering the chromaticity channels a* and b*, loss of accuracy caused by head movements is mitigated. In examples, the processor 102 converts the color space in this manner for a minimum of 320 consecutive images in the sequence of images 206, thus producing a sequence of color converted images. The processor 102 subsequently uses another neural network to predict a PPG signal based on the sequence of color converted images (e.g., a minimum of 320 consecutive, color converted images). For example, this neural network is a deep neural network that has been trained on data set(s) that accurately associate sequences of images (e.g., color converted images) with corresponding PPG signals, or at least that accurately associate aspects of sequences of images with aspects of PPG signals, thereby enabling the processor 102 to predict a specific PPG signal for any given sequence of color converted images. In some examples, this neural network may be trained using data set(s) including human facial images in different lighting conditions to mitigate the effects of poor or changing lighting conditions on the accuracy of the neural network. For some examples in which the sequence of images 206 is based on a frame rate of 30 FPS or higher, the predicted PPG signal has a sampling frequency of at least 60 Hz. FIG. 2 shows an example predicted PPG signal 210.

The executable code 108 includes converting the PPG signal to a frequency domain signal (308). Numerals 212 and 214 represent this conversion in FIG. 2. The processor 102 may convert the PPG signal 210 to the frequency domain by, e.g., applying a fast Fourier transform (FFT) to the PPG signal 210 to represent the PPG signal 210 in the frequency domain. In examples, the processor 102 additionally applies a frequency filter, such as a bandpass filter, that filters out certain frequencies as may be appropriate. In some examples, the bandpass filter removes signals for frequencies below 0.9 Hz and above 3 Hz, because the frequency range from 0.9 Hz to 3 Hz corresponds to a normal human heart rate range. The frequency range may be enlarged or reduced as desired for specific populations. For instance, the frequency range may be expanded downward (e.g., the 0.9 Hz filtering threshold reduced) for use in populations suffering from bradycardia. In this manner, the processor 102 produces a frequency domain signal 214.

The executable code 108 includes determining a heart rate by performing a frequency analysis on the frequency domain signal (310). Numerals 216 and 218 represent this determination in FIG. 2. Specifically, the processor 102 analyzes the frequency domain signal 214 to identify the dominant frequency (e.g., the frequency with the greatest normalized coefficient), and the processor 102 designates the dominant frequency as corresponding to the heart rate 218 of the subject. The processor 102 converts the dominant frequency to heart beats per minute, which is the heart rate 218 of the subject.

Figure 4:
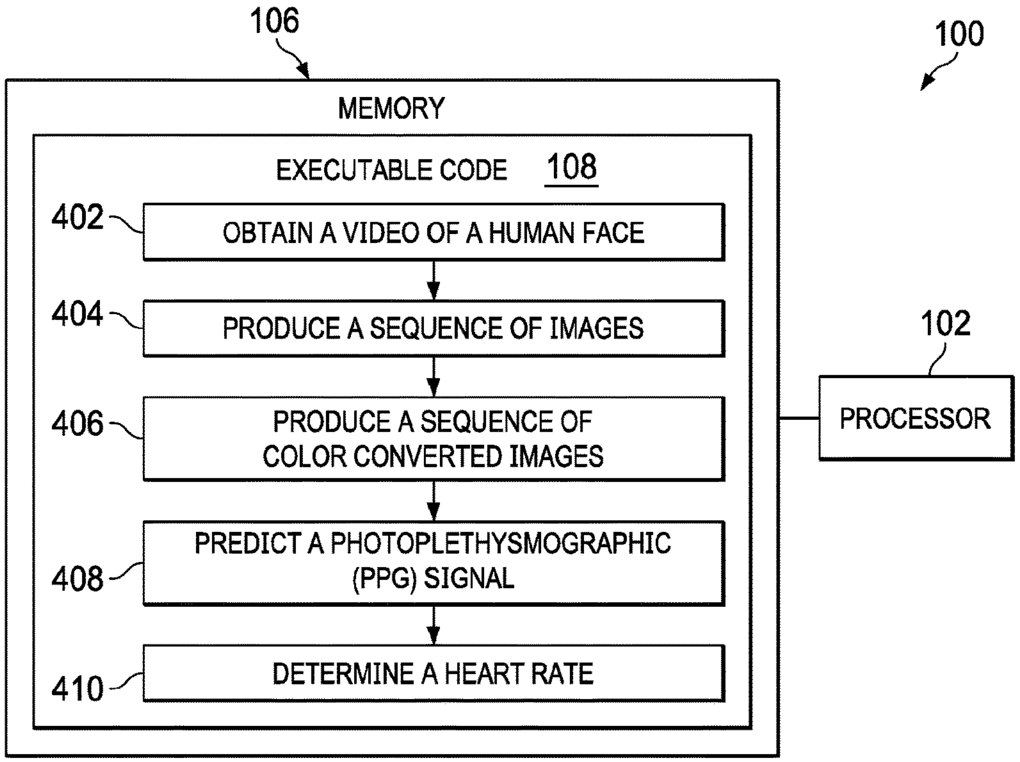
Figure 5:
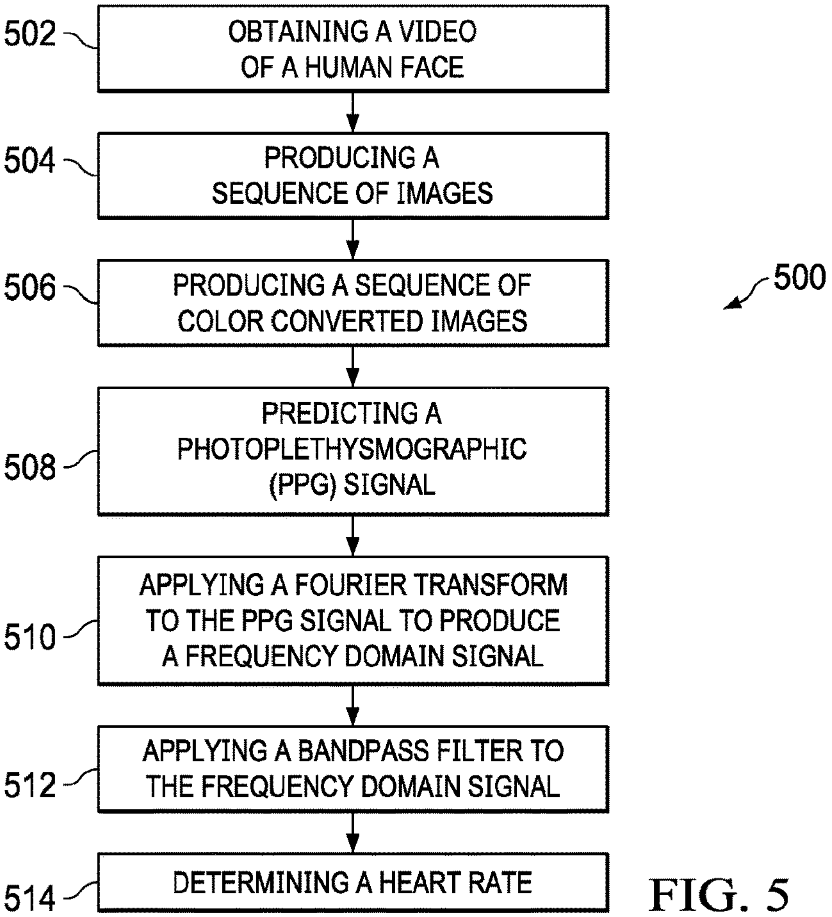
FIG. 5 is a flow diagram of a method for performing neural network-based heart rate determinations, in accordance with various examples.

FIG. 4 is a schematic block diagram of an example electronic device 100 to perform neural network-based heart rate determinations. The electronic device 100 of FIG. 4 includes the processor 102, the memory 106 coupled to the processor 102, and the executable code 108. The executable code 108 of FIG. 4 differs from that of FIG. 3. FIG. 5 depicts a method 500 for performing neural network-based heart rate determinations, in accordance with various examples. The executable code 108 of FIG. 4 and the method 500 are variations of the executable code 108 of FIG. 3 and the process flow 200, which are described in detail above. Thus, the executable code 108 of FIG. 4 and the method 500 are not described in detail for the sake of brevity. The executable code 108 includes obtaining a video of a human face (402). The executable code 108 includes using a first neural network and the video to produce a sequence of images of the human face (404). The executable code 108 includes producing a sequence of color converted images by converting a color space of the sequence of images from RGB to L*a*b (406). The executable code 108 includes using a second neural network to predict a PPG signal based on the sequence of color converted images (408). The executable code 108 includes determining a heart rate based on the PPG signal (410).

The method 500 includes obtaining a video of a human face, with the video having at least 10 FPS and including movement of the human face (502). The method 500 includes producing a sequence of images of the human face by applying a CNN to every $n^{th}$ frame of the video and using the predicted bounding box on the $n^{th}+1$, $n^{th}+2$ . . . , $n^{th}+(n-1)$ frames to produce the sequence of images of the human face, where the sequence of images includes at least 320 images (504). For example, the CNN may be applied to every fourth frame of the video, and so the bounding box predicted by applying the CNN to the first frame may also be used on the second, third, and fourth frames to produce images. The method 500 includes producing a sequence of color converted images by converting a color space of the sequence of images to L*a*b (506). The method 500 includes using a neural network to predict a PPG signal having a sampling frequency of at least 60 Hz based on the sequence of color converted images (508). The method 500 includes applying an FFT to the PPG signal to produce a frequency domain signal (510). The method 500 includes applying a bandpass filter to the frequency domain signal to produce a filtered frequency domain signal (512). The method 500 includes determining a dominant frequency in the filtered frequency domain signal to correspond to a heart rate (514).

Figure 6:
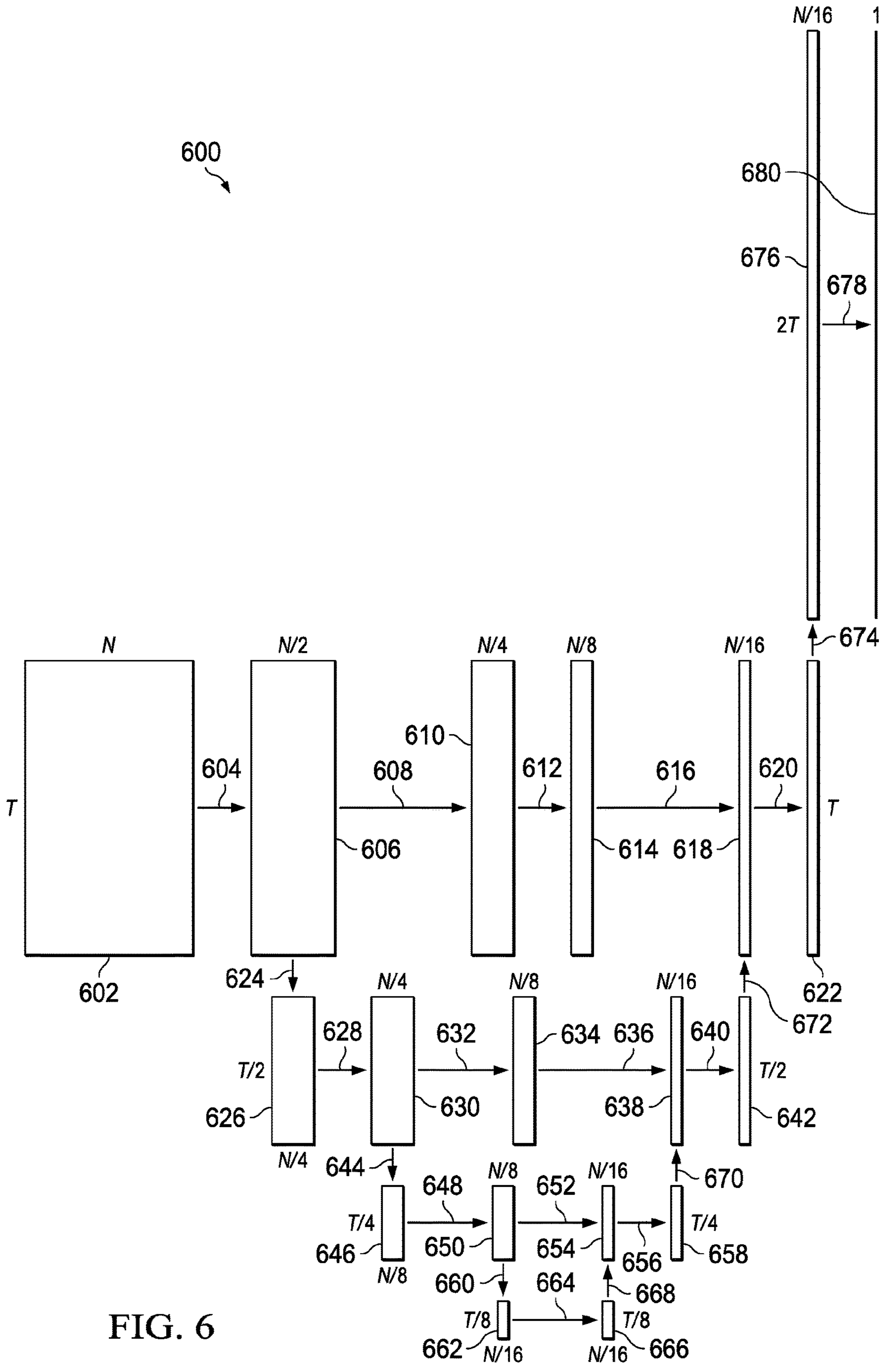
FIG. 6 is a schematic diagram of a neural network architecture for predicting a photoplethysmographic (PPG) signal based on a video of a human face, in accordance with various examples.

FIG. 6 is a schematic diagram of an architecture of a neural network 600 for predicting a photoplethysmographic (PPG) signal based on a video of a human face, in accordance with various examples. In examples, the neural network 600 corresponds to the neural network used in 306, 408, and 508 in FIGS. 3, 4, and 5, respectively, as well as in 208, 210 of FIG. 2. In examples, the neural network 600 is encoded in the executable code 108 of FIG. 1. In examples, the neural network 600 is a CNN. The neural network 600 receives a sequence of images 602 (e.g., the sequence of images 206 in FIG. 2). The sequence of images 602 includes T images, each image being an N×N square. The vertical dimension of the sequence of images 602 represents the number of images T. The horizontal dimension of the sequence of images 602 represents a dimension of the square image having length N, with the third dimension having length N hidden to preserve clarity and ease of understanding. The sequence of images 602 includes a fourth dimension because, in examples, two color channels a* and b* are used, but, like the third dimension, the fourth dimension is not expressly shown to preserve clarity and ease of understanding. Arrow 604 indicates that a convolutional block, which includes convolution (filtering), batch normalization, and max pooling, is applied to produce a downsampled sequence of images 606. The sequence of images 606 still has a number of images T but the size of each image has been reduced from N×N to N/2×N/2 by max pooling, as shown.

The sequence of images 606 is again downsampled by image size as arrows 608, 612, and 616 indicate, with convolution blocks producing a sequence of images 610 having a number of images T and an image size N/4×N/4, a sequence of images 614 having a number of images T and an image size N/8×N/8, and a sequence of images 618 having a number of images T and an image size N/16×N/16, respectively.

Arrow 624 indicates downsampling in image number, with convolution blocks producing a sequence of images 626 being T/2 in number and N/4×N/4 in image size. Arrow 628 indicates downsampling in image size, with convolution blocks producing a sequence of images 630 being T/2 in number and N/4×N/4 in image size. Arrow 632 indicates downsampling in image size, with convolution blocks producing a sequence of images 634 being T/2 in number and N/8×N/8 in image size. Arrow 636 indicates downsampling in image size, with convolution blocks producing a sequence of images 638 being T/2 in number and N/16×N/16 in image size.

Arrow 644 indicates downsampling in image number, with convolution blocks producing a sequence of images 646 being T/4 in number and N/8×N/8 in size. Arrow 648 indicates downsampling in image size, with convolution blocks producing a sequence of images 650 being T/4 in number and N/8×N/8 in size. Arrow 652 indicates downsampling in image size, with convolution blocks producing a sequence of images 654 being T/4 in number and N/16×N/16 in size.

Arrow 660 indicates downsampling in image number, with convolutional filtering producing a sequence of images 662 being T/8 in number and N/16×N/16 in size. Arrow 664 indicates that no further convolution blocks are performed in producing the sequence of images 666, which, like the sequence of images 662, are T/8 in number and N/16×N/16 in size.

Arrow 668 indicates that the sequence of images 666 is combined with the sequence of images 654. Both sequences of images 666, 654 contain images that are N/16×N/16 in size, and the combination thereof produces sequence of images 658, as arrow 656 indicates. Arrow 670 indicates that the sequence of images 658 is combined with the sequence of images 638, thus producing a sequence of images 642, as arrow 640 indicates. Arrow 672 indicates that the sequence of images 642 is combined with the sequence of images 618 to produce a sequence of images 622, as arrow 620 indicates. Arrow 674 indicates that the sequence of images 622 is upsampled to produce a sequence of images 676 having a number of images 2T and an image size N/16×N/16. Arrow 678 indicates that the sequence of images 676 is subjected to a pooling operation and a convolution block to produce the one-dimensional, 2T-length (e.g., 640) sequence of images 680, as shown.

Figure 7:
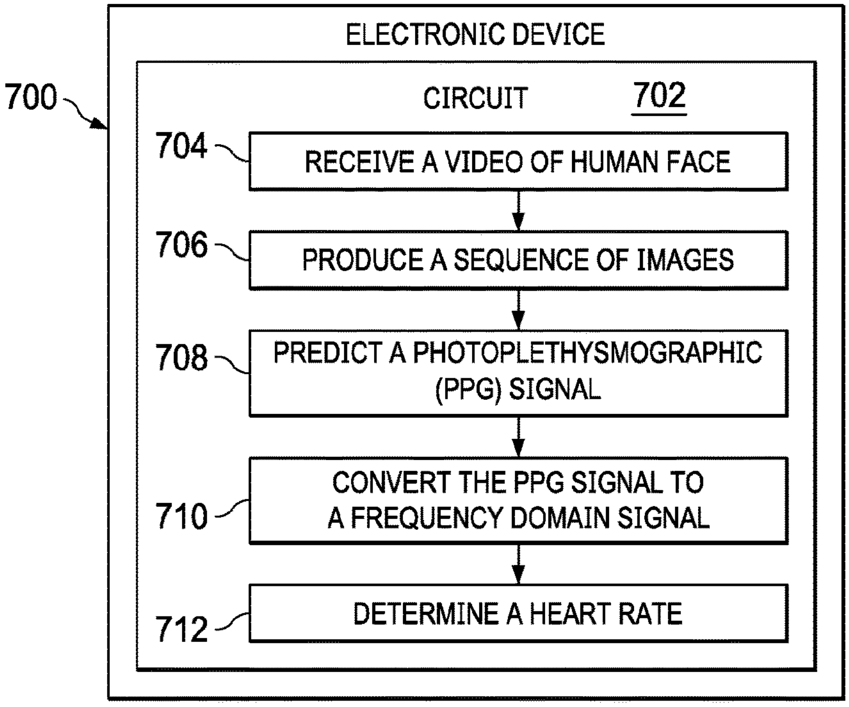
FIG. 7 is a schematic block diagram of an electronic device to perform neural network-based heart rate determinations, in accordance with various examples.

FIG. 7 is a schematic block diagram of an electronic device to perform neural network-based heart rate determinations, in accordance with various examples. Specifically, FIG. 7 shows an electronic device 700 that includes a circuit 702. The circuit 702 includes multiple circuit components, such as digital logic components, analog circuit components, or a combination thereof. In some examples, the circuit 702 is an application-specific integrated circuit. In some examples, the circuit 702 is a field programmable gate array that has been programmed using a suitable netlist generated using a hardware description language (HDL) description that implements some or all of the methods, process flows, and/or neural networks described herein. For instance, as shown in FIG. 7, the circuit 702 is to receive a video of a human face (704), use a facial detection technique to produce a sequence of images of the human face based on the video (706), use a neural network to predict a photoplethysmographic (PPG) signal based on the sequence of images (708), convert the PPG signal to a frequency domain signal (710), and determine a heart rate by performing a frequency analysis on the frequency domain signal (712).

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An electronic device, comprising:
- an interface to receive a video of a human face, the video having a plurality of frames;
- a memory storing executable code; and
- a processor coupled to the interface and to the memory, wherein, as a result of executing the executable code, the processor is to:
  - receive the video from the interface;
  - use a facial detection technique to produce a sequence of images of the human face based on every $n^{th}$ frame of the video, wherein n is a positive integer larger than 1;
  - use a neural network to predict a photoplethysmographic (PPG) signal based on the sequence of images, wherein the neural network is to receive as input the sequence of images corresponding to a frame rate and to generate as output the PPG signal having a sampling frequency higher than the frame rate of the sequence of images;
  - convert the PPG signal to a frequency domain signal; and
  - determine a heart rate by performing a frequency analysis on the frequency domain signal.

2. The electronic device of claim 1, wherein the interface is a network interface.

3. The electronic device of claim 1, wherein the interface is a peripheral interface for one of a camera and a removable storage device.

4. The electronic device of claim 1, wherein the use of the facial detection technique to produce the sequence of images includes application of a convolutional neural network (CNN) to every fourth frame of the video.

5. The electronic device of claim 1, wherein the use of the neural network to predict the PPG signal includes an application of at least 320 images of the human face to the neural network.

6. The electronic device of claim 5, wherein, as a result of executing the executable code, the processor is to convert a color space of the at least 320 images from red-green-blue to L*a*b*.

7. The electronic device of claim 1, wherein the video includes movement of the human face.

8. The electronic device of claim 1, wherein the video is a live stream that is provided to the processor via the interface.

9. The electronic device of claim 1, wherein the use of the neural network to predict the PPG signal includes downsampling the sequence of images in at least one of an image size or an image number, to produce a downsampled sequence of images.

10. The electronic device of claim 1, wherein the sampling frequency of the PPG signal is double the frame rate of the sequence of images, and wherein n is determined based on a frame rate of the video.

11. A non-transitory, computer-readable medium storing executable code, which, when executed by a processor, causes the processor to:
- obtain a video of a human face, the video having a plurality of frames;
- use a first neural network and every $n^{th}$ frame of the video to produce a sequence of images of the human face, wherein n is a positive integer larger than 1;
- produce a sequence of color converted images by converting a color space of the sequence of images from red-green-blue (RGB) to L*a*b*;
- use a second neural network to predict a photoplethysmographic (PPG) signal based on the sequence of color converted images, wherein the second neural network is to receive as input the sequence of color converted images corresponding to a frame rate and to generate as output the PPG signal having a sampling frequency higher than the frame rate of the sequence of color converted images; and
- determine a heart rate based on the PPG signal.

12. The electronic device of claim 1, wherein input of the neural network includes a first number of images corresponding to the sequence of images, wherein output of the neural network includes a second number of one-dimensional data samples corresponding to the PPG signal, and wherein the second number is double the first number.

13. The computer-readable medium of claim 11, wherein the first neural network has been trained using a data set including human facial images in different lighting conditions.

14. The computer-readable medium of claim 13, wherein the video is a real-time video.

15. The computer-readable medium of claim 13, wherein the video of the human face has a minimum frame rate of 10 frames per second and has a length of at least 10 seconds.

16. The computer-readable medium of claim 13, wherein the executable code, when executed by the processor, causes the processor to convert the PPG signal to a frequency domain signal and to determine the heart rate based on a dominant frequency of the frequency domain signal.

17. The computer-readable medium of claim 13, wherein the sampling frequency of the PPG signal is at least 60 Hz.

18. A method, comprising:

obtaining a video of a human face, the video having a frame rate of at least 10 frames per second and including movement of the human face;

producing a sequence of images of the human face using a convolutional neural network (CNN) and every $n^{th}$ frame of the video, wherein the sequence of images includes at least 320 images and wherein n is a positive integer larger than 1;

producing a sequence of color converted images by converting a color space of the sequence of images to L*a*b*;

using a neural network to predict a photoplethysmographic (PPG) signal having a sampling frequency of at least 60 Hz based on the sequence of color converted images corresponding to a second frame rate, wherein the sampling frequency of the PPG signal is higher than the second frame rate of the sequence of color converted images;

applying a Fourier transform to the PPG signal to produce a frequency domain signal;

applying a bandpass filter to the frequency domain signal to produce a filtered frequency domain signal; and determining a dominant frequency in the filtered frequency domain signal to correspond to a heart rate.

19. The method of claim 18, wherein the bandpass filter is to filter out frequencies lower than 0.9 Hz and higher than 3 Hz.

20. The method of claim 18, wherein every $n^{th}$ frame of the video is every $4^{th}$ frame of the video.

* * * * *